United States Patent
Cancel et al.

[15] 3,647,062
[45] Mar. 7, 1972

[54] MACHINE FOR SEPARATING COFFEE BEANS AND BERRIES FROM TRASH MATERIAL

[72] Inventors: Luis E. Cancel, Alamo-Guaynabo; Jose Manuel Rivera-Ortiz, Bayamon; Francisco Garcia-Rivera, Bayroa-Caguas, all of P.R.

[73] Assignee: Commonwealth of Puerto Rico

[22] Filed: Nov. 2, 1970

[21] Appl. No.: 85,975

[52] U.S. Cl. .................................209/3, 209/75, 209/133
[51] Int. Cl. .................................................B07b 3/00
[58] Field of Search.................209/115, 119, 120, 133–139, 209/3

[56] References Cited

UNITED STATES PATENTS

| | | | |
|---|---|---|---|
| 2,629,491 | 2/1953 | Sutherland | 209/136 |
| 2,766,880 | 10/1956 | Schaub et al. | 209/138 |
| 2,973,862 | 3/1961 | Vail | 209/136 |
| 3,441,131 | 4/1969 | Gebauer | 209/3 |

Primary Examiner—Richard A. Schacher
Assistant Examiner—Gene A. Church
Attorney—Scrivener, Parker, Scrivener & Clarke

[57] ABSTRACT

A mixture of coffee beans and berries with twigs, leaves, snails and other trash material is obtained when coffee is harvested by spreading nets beneath the bushes. The trash in this mixture is separated from the coffee beans and berries by pouring the entire mixture vertically downwardly into the machine provided by the invention. The mixture falls into a forced updraft of air which is sufficiently strong that the coffee beans and berries and the heavier components of the mixture fall through it by gravity but leaves and other lighter components will not fall through it and are removed by the updraft. The components that fall through the updraft impinge on the inclined vibrating surface which is located in a stream of air, and the coffee beans and berries are separated from the high-density components of the mixture at this point.

5 Claims, 5 Drawing Figures

PATENTED MAR 7 1972

3,647,062

INVENTORS
LUIS E. CANCEL
JOSE MANUEL RIVERA ORTIZ
FRANCISCO GARCIA RIVERA

BY
*Scrivener Parker Scrivener + Clarke*
ATTORNEYS

MACHINE FOR SEPARATING COFFEE BEANS AND BERRIES FROM TRASH MATERIAL

DESCRIPTION OF THE INVENTION

Coffee harvesting, as practiced in most of the coffee-producing regions of the world, is a high labor-consuming operation, in addition to which there are heavy losses of coffee berries during the picking operation. Because of these factors coffee regions with acute labor shortage, high labor cost and high land value are in need of changes in current harvesting and processing procedures.

Silva, S., Vicente-Chandler, J., and Abruna, F. in "Field losses of coffee and improved harvesting methods in intensively-managed plantations" J. Agr., Univ. of P. R. 53 (4): 268–273, 1969, have described a low-cost method of harvesting coffee which reduces field losses of coffee, reduces labor requirements to less than one third, and increases yields of harvested coffee by over 50 percent as compared with current practices. The coffee-harvesting method developed by them consists in spreading plastic nets on the ground in high-yielding coffee plantations, maintaining the nets on the ground for about 5 weeks, and collecting the material deposited on the nets. This material consists of a large volume of leaves, twigs, snails and decomposed organic matter mixed with coffee beans and coffee berries in various stages of maturity and in different phases of fermentation. The coffee thus obtained must be separated from the foreign matter so that it can be processed by existing methods, and at present there is no equipment available for effecting this separation.

The separation of the beans and berries from this mixture is a difficult operation for various reasons. The physical behavior of the material collected is very unpredictable due to its hetergeneous composition, the main factor affecting the behavior of this material being the weather prevailing during the harvesting season. Humidity conditions during the coffee-collecting period, that is during the period that the plastic nets have been resting on the ground, act in a decisive way in conditioning the material deposited on the nets, rainy weather during the coffee-collecting period leading to caking of part of the material collected on the nets, while on the other hand dry windy weather during the coffee collecting period provides a material that is completely loose and light in weight.

By the present invention we have provided a machine to which the mixture of various materials collected on the nets is supplied, and which operates on the mixture to separate the coffee beans and berries from the other, useless components of the mixture which are collectively referred to in this specification as trash, it being noted that the trash consists of both lighter and heavier components.

Figure 1:
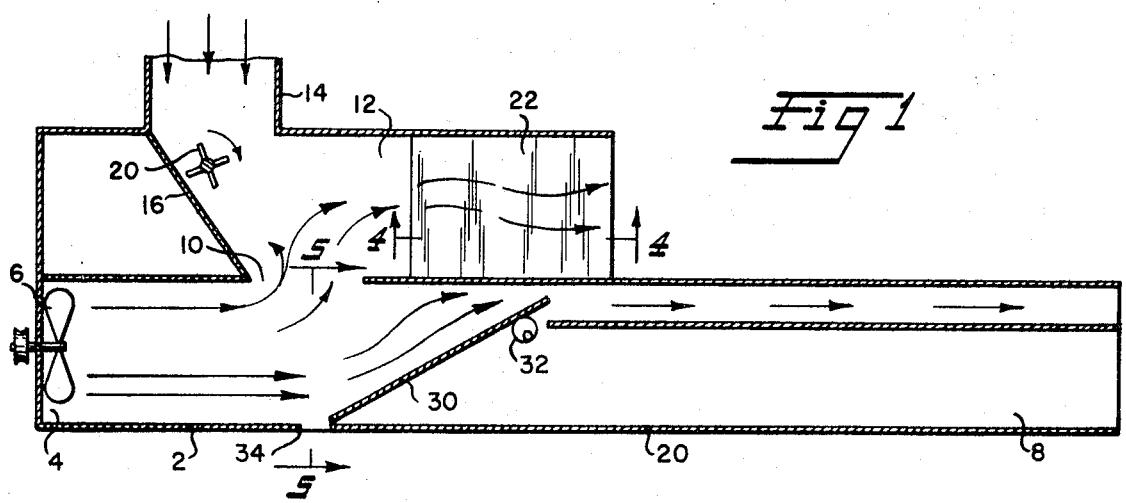
FIG. 1 is a vertical sectional, schematic view through the machine provided by the invention.
Figure 2:
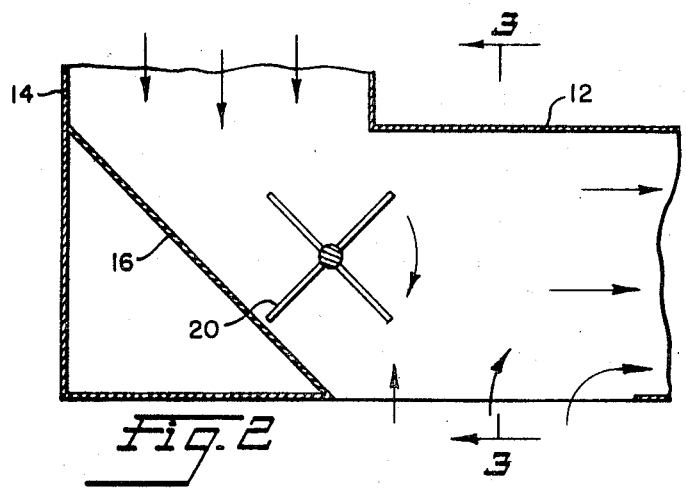
FIG. 2 is an enlarged view of the intake part of the machine.
Figure 3:
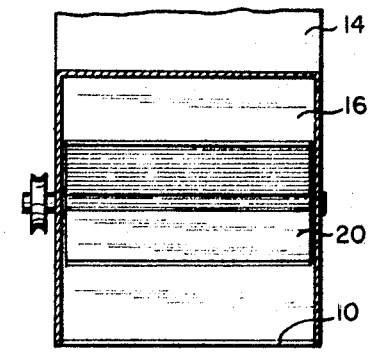
FIG. 3 is a sectional view taken on line 3—3 of FIG. 2.

An embodiment of the machine provided by the invention is disclosed in the drawings and comprises, first, a lower, elongated, horizontal, open-ended duct 2, at one end 4 of which is positioned a fan 6 which is rotated by any suitable means to force air into and through the duct to its discharge opening 8. Inwardly of the intake opening 4 an opening 10 communicates duct 2 with horizontal duct 12 which is positioned immediately above and parallel to the lower duct 2. An input duct 14 extends upwardly from horizontal duct 12 and provides a passage through which the mixture of materials gathered on the nets is fed to the machine. An inclined plate 16 underlies input duct 14 with its upper edge at the lower edge of duct 14 and its lower edge in the upper edge of opening 10 so that the upper surface of the plate provides an inclined surface down and along which some material from the input duct 14 passes through the opening 10. A paddle wheel 20 is mounted adjacent the upper surface of plate 16 on a horizontal axis and is rotated in such a direction that in moving over and adjacent the surface of the plate the paddles, which are approximately coextensive with the width of the plate, as shown in FIG. 3, move oppositely to the direction of movement of the material passing down the plate, as indicated by the arrow in FIGS. 1 and 2.

Figure 4:
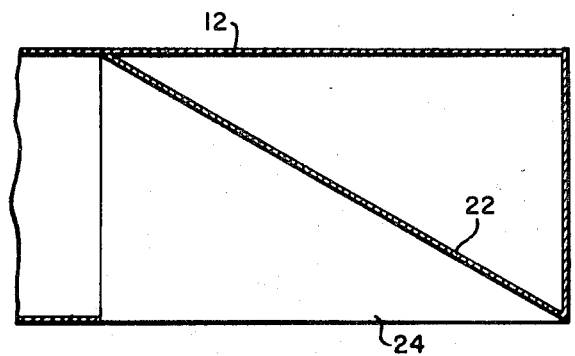
FIG. 4 is a view taken on line 4—4 of FIG. 1.
Figure 5:
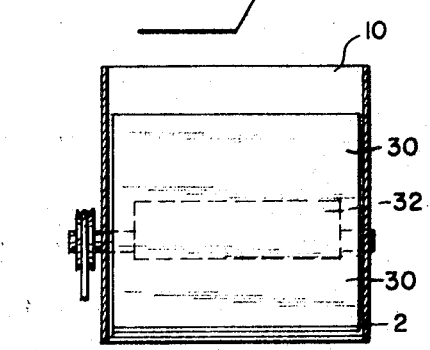
FIG. 5 is a view taken on line 5—5 of FIG. 1.

The upper, horizontal duct 12 extends beyond its intersection with the opening 10 and at its end there is a vertical plate 22 which lies across duct 12 so that it deflects material passing through that duct and causes it to discharge out through an opening 24 in the side of duct 12 as shown particularly in FIG. 4.

Within the lower horizontal duct 2 and underlying opening 10 is an inclined plate 30 which is associated or connected with means 32 by which the plate is continuously oscillated in its own inclined plane. The lower end of this plate lies at the edge of a downwardly opening passage 34 in the lower wall of duct 2, and the upper end of the plate lies below the upper wall of duct 2. A horizontal plate 36 is positioned within duct 2 and extends from the upper end of plate 30 to the discharge end 8 of duct 2, thus providing a passage 38 communicating at its one end with the opening above plate 30 and at its other end with the discharge end 8 of duct 2.

The operation of the machine will now be described. Fan 6 provides to the entire machine a steady stream of air under considerable pressure. The stream entering duct 2 is partially deflected upwardly by oscillating plate 30 through opening 10 to produce an upward stream. Mixed material, including coffee beans and berries, and trash collected from the nets is supplied to the machine through input duct 14 from which it falls onto inclined plate 16, where the rotating paddle wheel 20 stirs and breaks up this material and causes its lighter and heavier components to be separated. The lighter components are caught by the upwardly directed blast of air from opening 10 and are blown through the upper horizontal duct 12 to plate 22 which deflects them out of the machine through opening 24. The heavier components of the mixture supplied to the machine through input duct 14 fall from inclined plate 16 through the ascending stream of air and through opening 10 to the oscillating plate 30. The heavier components of the material impinging on plate 30 are shaken by the plate to move downwardly along the plate against the force of the air stream impinging on it, and fall through the discharge passage 34 to be collected. The other components of the material impinging on plate 30 are urged upwardly along the plate by the combination of its oscillatory movement and the air stream, and pass over the upper edge of the plate to the passage 38 in duct 2, along and through which they are moved by the air blast to be removed from the machine at discharge opening 8.

We have found that best results are produced if the inclined plate 16 is at an angle with the horizontal that is large enough to facilitate slipping of wet, sticky material along the plate but not large enough to permit the falling material to attain a high velocity, and an angle of 45° to 50° to the horizontal has been found to give optimum results. The dispersing paddle wheel 20 preferably has rubber paddles or fingers and produces good results in breaking up the falling mixture when rotated at about 145 r.p.m. We have also found that good results are produced if the plate 30 is inclined at an angle of about 32° to the horizontal and is oscillated at a speed of the order of 912 v.p.m. with a stroke of about one-half inch.

We claim:

1. A machine for separating coffee beans and berries from a mixture of beans, berries and trash, comprising means in the machine for producing an upwardly directed airstream, a horizontally directed airstream at the upper end of the upwardly directed airstream and communicating therewith, and a second horizontally directed airstream at the lower end of the upwardly directed airstream and also communicating therewith, means for introducing a mixture into and through the upper horizontally directed airstream into the upwardly directed airstream and then into and through the lower horizontally directed airstream, whereby the trash is removed by the horizontally directed airstreams and the beans and berries pass through all of the airstreams for removal.

2. A machine for separating coffee beans and berries from a mixture of beans, berries and trash comprising two adjacent horizontal ducts, an opening connecting the two horizontal ducts, the upper duct having an opening through which the mixture may be introduced into the upper duct, means for producing a stream of air under pressure flowing in the same direction in the two horizontal ducts and upwardly through the opening connecting the two ducts, the upwardly flowing airstream being of sufficient force that beans, berries and heavier trash will fall through it but lighter trash will not, means for guiding a mixture introduced into the upper horizontal duct and into the upwardly flowing airstream therein whereby the beans, berries and heavier trash fall through the connecting opening to the lower horizontal duct, an inclined plate in the lower horizontal duct covering only the lower part of the sectional area of that duct, means for vibrating the plate in its own plane, the plate being positioned to receive the beans, berries and heavier trash falling through the connecting opening and being inclined in the direction of movement of the stream of air in the lower horizontal duct, and a discharge opening in the lower horizontal duct adjacent the lower end of the inclined plate, the force of the stream of air in the lower horizontal duct and the angle of inclination and the rate of vibration of the inclined plate being such that beans and berries fall downwardly on the inclined plate to pass out through the discharge opening in the lower horizontal duct while the heavier trash is carried beyond the inclined plate by the airstream in the lower horizontal duct.

3. A machine according to claim 2, in which the means for guiding the mixture through the connecting opening comprises an inclined plate which is so positioned that the mixture which is introduced into the machine strikes its upper surface.

4. A machine according to claim 3, comprising in addition a rotating paddle wheel mounted on a horizontal shaft with the outer ends of its blades adjacent the upper surface of the inclined plate.

5. A machine according to claim 4, in which the paddle wheel is rotated so that its blades move oppositely to the direction of movement of the mixture along the inclined plate.

* * * * *